Patented May 31, 1949

2,471,766

UNITED STATES PATENT OFFICE 2,471,766

COPOLYMER OF STYRENE AND A PHENYL-VINYL ACETATE

David T. Mowry and Charles L. Mills, Jr., Dayton, Ohio, assignors to Monsanto Chemical Company, St. Louis, Mo., a corporation of Delaware No Drawing. Application November 15, 1947, Serial No. 786,331

5 Claims. (Cl. 260—86)

This invention relates to the production of valuable resinous products by the conjoint polymerization of styrene and various phenyl-vinyl acetates. More particularly the invention relates to polymers of styrene having improved physical and chemical properties.

Polystyrene is a valuable and useful article of commerce but its use is considerably limited by its lack of adequate thermal stability. Although vinyl acetate is well known as a polymerizable substance, the copolymers of vinyl acetate and styrene are known to be difficult to prepare. Similar vinyl esters containing substituents in either the alpha or beta positions are also known to be difficultly polymerizable.

One purpose of this invention is to provide polymers of styrene having improved physical and chemical properties, and especially improved thermal stability. A further purpose of this invention is to prepare copolymers of styrene and alpha substituted vinyl acetates.

Although copolymers of styrene and vinyl acetate are known to be difficultly polymerizable and substituted vinyl groups are known to be less polymerizable than unsubstituted vinyl groups its would be expected that copolymers of styrene and alpha-phenyl-vinyl acetate would be either nonexistent or difficult to prepare. It has been found that these copolymers may be prepared and that they have very desirable physical properties, being capable of a wider range of use than polystyrene.

In accordance with this invention it has been found that copolymers of 70 to 98 percent of styrene and from 2 to 30 percent of alpha-phenyl-vinyl acetate may be prepared and have the desirable properties above described.

The phenyl-vinyl acetates which are capable of use in the practice of this invention have the following structural formula:

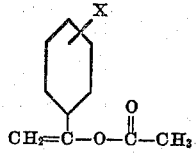

wherein X is a radical of the group consisting of hydrogen, and chlorine. The comonomers are prepared by the reaction of acetophenones with ketones in the presence of a trace of sulfuric acid as a catalyst.

Polymerization in accordance with this invention involves mixing the styrene and the phenyl-vinyl acetate in the proper proportion and heating to effect a copolymerization reaction. Although this invention may be practiced using from 70 to 98 percent of styrene and the balance of a phenyl-vinyl acetate, preferred compositions are the copolymers of 80 to 95 percent styrene and from 5 to 20 percent of a phenyl-vinyl acetate. It is generally desirable to use mass polymerization methods, which are conducted by heating the mixed monomers in the presence of from 0.005 to 1.0 percent of an oxygen producing substance, such as benzoyl peroxide, hydrogen peroxide, acetyl peroxide, or other soluble peroxy compounds having in its structure a peroxide linkage (—O—O—). The rate of copolymerization will depend upon the temperature and upon the quantity and particular nature of the catalyst used. Temperatures between 50° C. and 200° C. may be used, but generally the reactions are conducted by initiating polymerization at a lower temperature and gradually increasing the temperature as the polymerization proceeds. Generally from 5 to 200 hours are required to complete the reaction and produce a clear, transparent, solid substance but frequently longer periods of time are used. The solid copolymer so obtained is then ground to particles of the desired size and may be used in the manufacture of transparent molded articles, or for any other purpose for which polystyrene is customarily used.

Emulsion copolymers may be prepared by heating the mixed monomers in an aqueous medium while stirring, tumbling, or otherwise agitating the reaction mass, to maintain the monomer in finely divided suspension in the water. Usually an emulsifying agent is used, for example a rosin soap, sodium alkyl sulfate, triethanol amine, sulfonated hydrocarbons, water soluble salts of high molecular weight fatty acids, and mixtures thereof obtained by saponification of animal and vegetable oils, and other compounds containing both hydrophobic and hydrophilic radicals. When the polymerization is complete the solid polymer is separated from the aqueous phase and unreacted monomers by filtration. In some cases it may be necessary to precipitate the emulsion by destroying the effectiveness of the emulsifier, for example by acidifying the emulsion. The copolymer in the finely divided form obtained by the filtration operation may be used directly as a molding powder.

Further details of the preparation of the new copolymers are set forth in the following examples.

Example 1

Styrene and alpha-phenyl-vinyl acetate were mixed in 95-5 and 90-10 proportions by weight and mixed with 0.1 percent by weight of benzoyl peroxide. The monomer mixtures and a similarly catalyzed sample of styrene were heated for three days at 100° C. and for two days at 135° C. All of the samples produced clear hard and colorless resins. The following table demonstrates the improved heat distortion points caused by the presence of the alpha-phenyl-vinyl acetate upon the polymerized products.

| Phenyl-vinyl Acetate | Styrene | Heat Distortion |
|---|---|---|
|  |  | °C. |
| 0 | 100 | 88 |
| 5 | 95 | 98 |
| 10 | 90 | 96 |

*Example 2*

Mixtures of alpha-phenyl-vinyl acetate and styrene 3-97 and 5-95 proportions, and a sample of styrene were each mixed with 0.1 percent benzoyl peroxide and heated at 100° C. for four days to produce clear, hard, colorless resins. The following table indicates the improvement effected by the use of small proportions of phenyl-vinyl acetate upon the heat stability of the styrene polymers.

| Phenyl-vinyl Acetate | Styrene | Heat Distortion |
|---|---|---|
|  |  | °C. |
| 0 | 100 | 86 |
| 3 | 97 | 94 |
| 5 | 95 | 96 |

*Example 3*

A mixture of 95 percent by weight styrene and 5 percent alpha-phenyl-vinyl acetate was added to two parts by weight of distilled water containing 0.1 percent (based on weight of monomers) of potassium persulfate and 0.5 percent of alkylaryl sulfonate having an average of 26 carbon atoms per molecule. The polymerization was conducted at the reflux temperature (about 93° C.) and four hours were required to complete the addition of the monomers. The reaction mass was then distilled to remove unreacted monomers and filtered to separate the copolymers. The resulting copolymer had a heat distortion point of 96° C.

Although this invention has been described with respect to certain specific embodiments thereof, it is not intended that the details shall be construed as limitations upon the scope of the invention except to the extent incorporated in the following claims.

We claim:

1. A copolymer of from 70 to 98 percent by weight of styrene and from 30 to 2 percent of a phenyl-vinyl acetate having the structural formula:

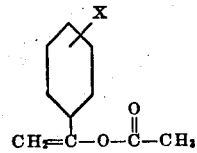

wherein X is a radical of the group consisting of hydrogen and chlorine.

2. A copolymer of 70 to 98 percent styrene and from 30 to 2 percent of alpha-phenyl-vinyl acetate.

3. A copolymer of 70 to 98 percent of styrene and from 30 to 2 percent of alpha-(para-chlorophenyl)-vinyl acetate.

4. The method of preparing a copolymer which comprises mixing from 70 to 98 percent by weight of styrene and from 30 to 2 percent of a phenyl-vinyl acetate having the structure:

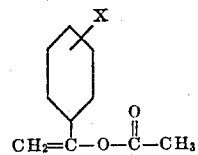

wherein X is a radical of the group consisting of hydrogen and chlorine, heating the mixed monomers in the presence of a peroxy catalyst at 50 to 200° C., and recovering the resulting copolymers.

5. The method defined by claim 4 wherein the copolymers are prepared in an aqueous medium with vigorous agitation in the presence of an emulsifying agent.

DAVID T. MOWRY.
CHARLES L. MILLS, Jr.

REFERENCES CITED

The following references are of record in the file of this patent:

Marvel et al., J. American Chemical Society, vol. 62, pp. 45-49 (January 1940).